(12) United States Patent
DeRoche

(10) Patent No.: US 9,327,916 B2
(45) Date of Patent: May 3, 2016

(54) ROTATING-SPIRAL DIVERTER

(71) Applicant: Laitram, L.L.C., Harahan, LA (US)

(72) Inventor: Timothy J. DeRoche, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/409,996

(22) PCT Filed: Jun. 28, 2013

(86) PCT No.: PCT/US2013/048646
§ 371 (c)(1),
(2) Date: Dec. 19, 2014

(87) PCT Pub. No.: WO2014/008133
PCT Pub. Date: Jan. 9, 2014

(65) Prior Publication Data
US 2015/0259157 A1    Sep. 17, 2015

Related U.S. Application Data

(60) Provisional application No. 61/668,185, filed on Jul. 5, 2012.

(51) Int. Cl.
*B65G 47/10* (2006.01)
*B65G 47/71* (2006.01)
*B65G 33/06* (2006.01)
*B65G 47/53* (2006.01)
*B65G 37/00* (2006.01)

(52) U.S. Cl.
CPC ............... *B65G 47/71* (2013.01); *B65G 33/06* (2013.01); *B65G 37/00* (2013.01); *B65G 47/53* (2013.01)

(58) Field of Classification Search
CPC ........ B65G 47/41; B65G 47/53; B65G 47/54; B65G 33/06; B65G 13/10
USPC ............ 198/370.03, 370.09, 370.1, 625, 786; 193/35 MD
See application file for complete search history.

(56) References Cited

U.S. PATENT DOCUMENTS

2,969,868 A * 1/1961 Krellen ................. B65G 47/71
                                                    198/370.01
3,356,236 A * 12/1967 Shaw ....................... B64D 9/00
                                                    193/35 MD
3,587,818 A * 6/1971 Hansen .................. B65G 47/54
                                                    198/368

(Continued)

FOREIGN PATENT DOCUMENTS

JP          04122525 U      11/1992
KR        1020120065299 A   6/2012

*Primary Examiner* — William R Harp
(74) *Attorney, Agent, or Firm* — James T. Cronvich

(57) ABSTRACT

A conveyor having an article-diverting device with left-handed and right-handed spirals rotated in the same direction to transport articles in a first direction or in opposite directions to transport articles in a different second direction. The left-handed spirals are arranged alternately and parallel to the right-handed spirals. Rotating all the spirals at the same speed in the same direction in one version of the conveyor passes articles straight across the spirals perpendicular to the axes of rotation of the spirals. Rotating the left-handed spirals opposite to the right-handed spirals diverts the articles atop the spirals parallel to their axes of rotation. In other versions, one set of spirals is constantly rotated and the other set is actuated by geared engagement into and out of rotation in the opposite direction or by raising and lowering into and out of position in contact with articles.

19 Claims, 6 Drawing Sheets

(56) References Cited

U.S. PATENT DOCUMENTS

| | | |
|---|---|---|
| 3,983,988 A | 10/1976 | Maxted et al. |
| 5,868,238 A | 2/1999 | Bonnet |
| 6,116,405 A * | 9/2000 | Gauchon ............... B65G 13/10 198/370.09 |
| 8,684,169 B2 * | 4/2014 | Itoh ..................... B65G 13/075 198/370.06 |
| 2009/0152074 A1 | 6/2009 | Wolf |
| 2012/0048678 A1 * | 3/2012 | Itoh ..................... B65G 13/075 198/577 |

* cited by examiner

ROTATING-SPIRAL DIVERTER

BACKGROUND

The invention relates generally to power-driven conveyors and more particularly to article-diverting devices using rotating spirals to transport articles in a selected direction.

Some conveying applications require that selected articles being conveyed along a main conveying path be diverted off the main path and conveyed away in another direction, while the rest of the articles continue to advance along the main path. But article-diverting devices tend to have a lot of moving parts, which can be difficult to clean and not practical for use in food-handling and other sanitary applications.

SUMMARY

An article-diverting conveying device embodying features of the invention comprises a frame, first and second sets of spirals rotatably supported in the frame, and a motorized spiral drive rotating the first and second sets of spirals. The spirals in the first set are left-handed spirals; the spirals in the second set are right-handed spirals. Both sets have axes of rotation parallel to each other. The motorized spiral drive rotates the first and second sets in the same direction to transport conveyed articles across the spirals in a first direction. The motorized spiral drive rotates the first set and the second set in opposite directions to transport conveyed articles across the spirals in a different second direction. Used in a conveyor, the diverting device receives articles from an infeed conveyor.

BRIEF DESCRIPTION OF THE DRAWINGS

These features of the invention, as well as its advantages and other aspects, are described in more detail in the following description, appended claims, and accompanying drawings, in which:

DETAILED DESCRIPTION

Figure 1:
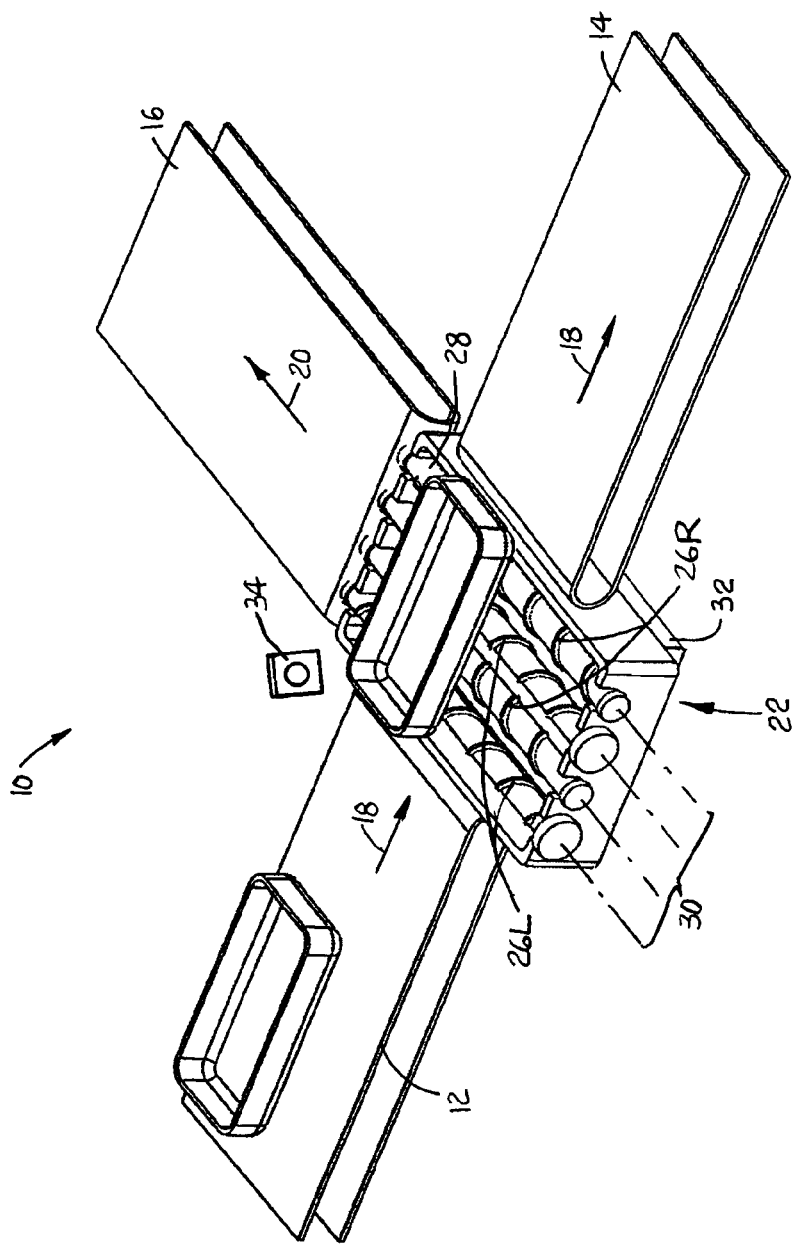
FIG. 1 is an isometric view of a conveyor having an article-diverting device embodying features of the invention.

A conveyor system embodying features of the invention is shown in FIG. 1. A conveyor system 10 comprises an infeed conveyor 12, an in-line receiving conveyor 14, and a transverse receiving conveyor 16. The infeed conveyor 12 and the in-line receiving conveyor 14 are shown as belt conveyors advancing in an in-line first conveying direction 18. The transverse receiving conveyor 16 advances in a different second conveying direction 20, in this example, perpendicular to the first direction 18.

The three conveyors 12, 14, 16 each abut a different side of an article-diverting device 22. The diverting device shown is a generally rectangular frame 24 supporting four spirals 26L, 26R. The spirals are shown in this example as helical blades formed on the peripheries of screw- or auger-like cylindrical rolls 28. But in another embodiment, the spiral can be the worm of a corkscrew-like element with shaft-like extensions at each end of the worm forming an axis of rotation. In the version shown in FIG. 1, the spirals in a first set 26L are left-handed spirals, and the spirals in the second set 26R are right-handed spirals. The left- and right-handed spirals alternate in the frame in this version. The axes of rotation 30 of the spirals 26L, 26R are parallel to each other and to the second conveying direction 20 and perpendicular to the in-line first conveying direction 18. The spirals 26L, 26R are rotatably supported in the frame and rotated about their axes of rotation by a motorized spiral drive 32 coupled to the spirals. Conveyed articles ride on the edges of the helical blades or worms at their topmost points. A sensor 34, such as an optical sensor or a visioning system, is used to detect the presence of an article on the diverting device 22. The motorized spiral drive selectively rotates each set 26L, 26R of spirals clockwise or counterclockwise to pass articles straight through the diverter 22 from the infeed conveyor to the in-line receiving conveyor 16 or to divert the articles onto the perpendicularly disposed receiving conveyor 18.

Figure 2:
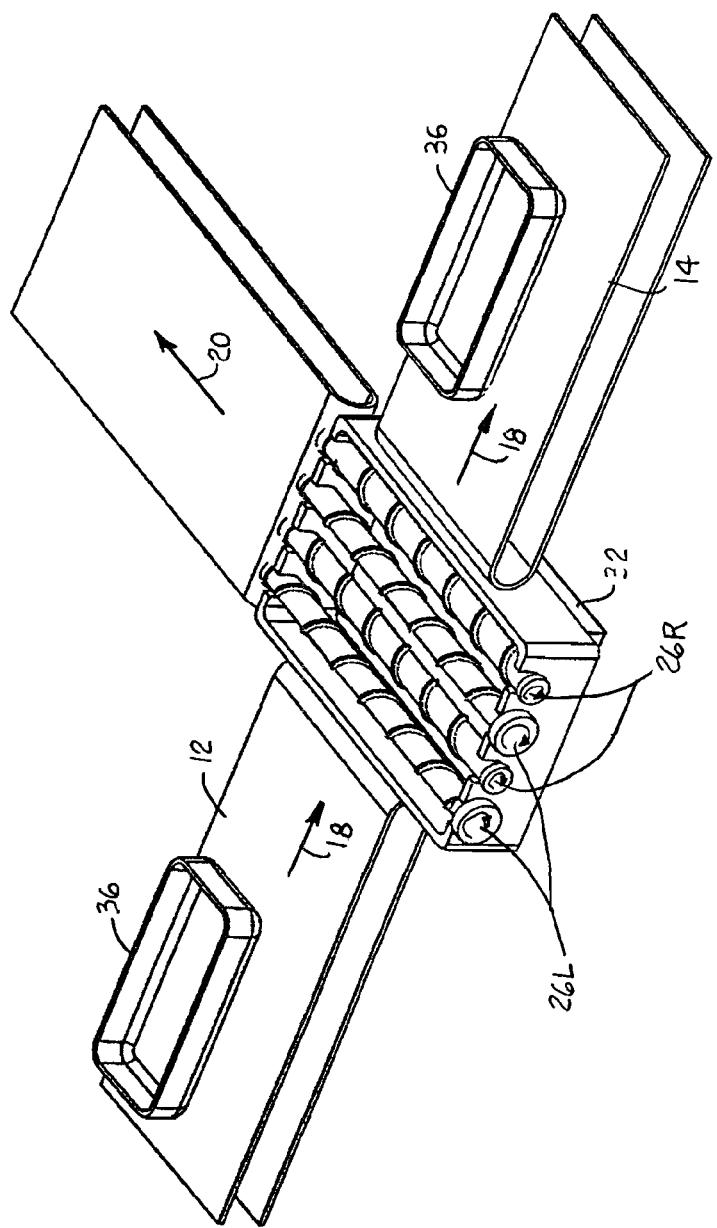
FIG. 2 is an isometric view of the conveyor of FIG. 1 showing conveyed articles being transported in line.

In FIG. 2, the motorized spiral drive 32 rotates the set of left-handed spirals 26L and the set of right-handed spirals 26R clockwise, when viewed from the viewpoint of a viewer of FIG. 2. Because alternate spirals are opposite-handed and rotating in the same direction, the net lateral force on the bottom of an article 36, such as a tray, in the second direction 20 is zero; and the article is pushed across the spirals 26L, 26R in the first direction 18 from the infeed conveyor 12 and onto the in-line receiving conveyor 14. The article translates without turning about its vertical axis. In other words, the article maintains its absolute orientation whether diverted or not.

Figure 3:
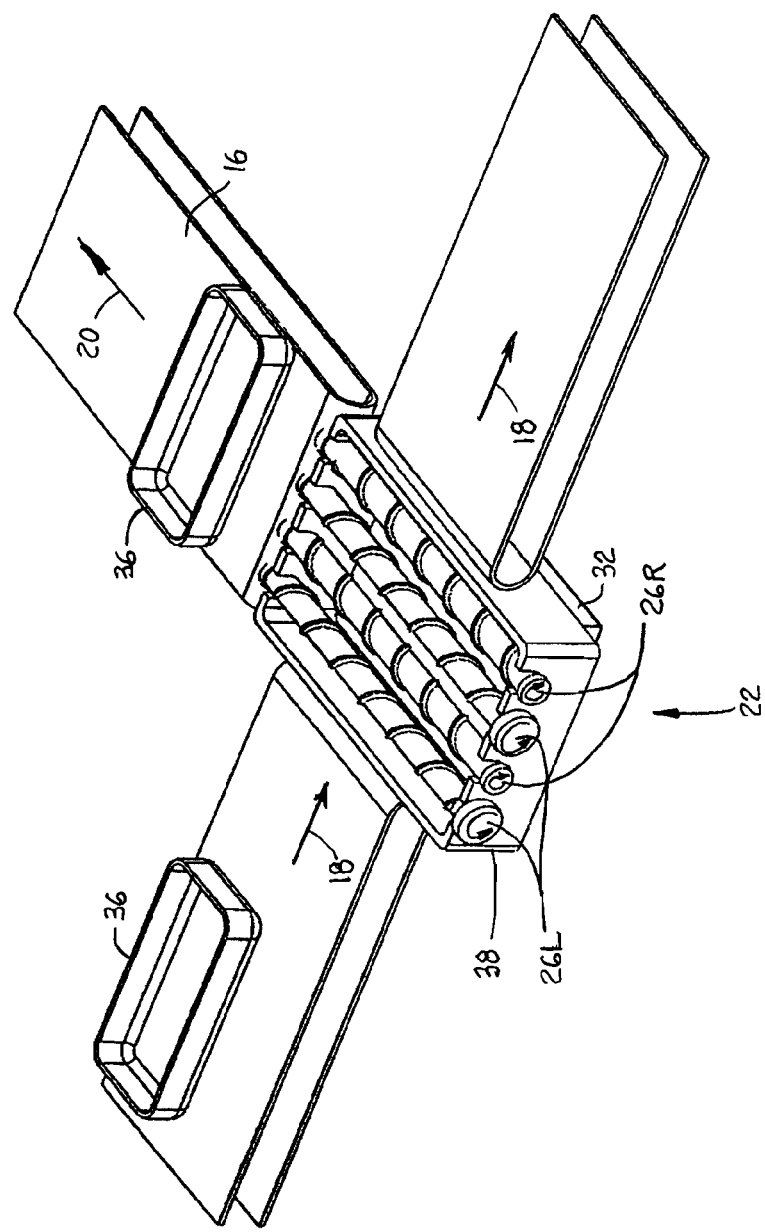
FIG. 3 is an isometric view of the conveyor of FIG. 1 showing conveyed articles diverted to one side.

In FIG. 3, the motorized spiral drive 32 rotates the right-handed spirals 26R clockwise and the left-handed spirals 26L counterclockwise, when viewed from the viewpoint of a viewer of FIG. 3. This produces a net force acting along the second direction 20 perpendicular to the in-line first conveying direction 18. The article 36 is transported across the spirals and onto the second receiving conveyor 16—again without turning. By rotating each of the spirals in the opposite directions to those shown in FIG. 3, articles can be diverted in the direction opposite to the second direction 20 and onto a third conveyor (not shown, but leading away from the fourth side 38 of the diverter 22 opposite to the second conveyor 16).

The spirals 26L, 26R may have a rounded outer edge that contacts the bottoms of the articles to minimize scoring and scuffing. To better grip the articles without scoring their bottoms, the spirals, or their edges, may be made of a high-friction material, such as a rubber or elastomeric material. The edges of the spirals at their topmost positions are tangent to the planes of the infeed and receiving conveyors to receive conveyed articles smoothly.

In the conveying examples illustrated in FIGS. 2 and 3, the motorized spiral drive rotated all the spirals at the same speed to achieve 0° or 90° translation of the articles without turning about a vertical axis. But more complex motions of the articles can be obtained by rotating the spirals at different speeds. Those complex motions include diversion along trajectories oblique to the main conveying direction 18 and turning of the articles about vertical axes.

Figure 5:
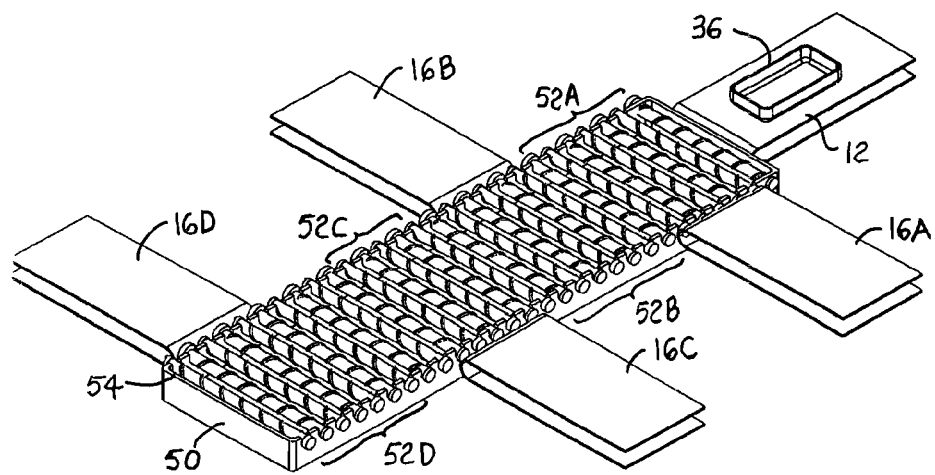
FIG. 5 is an isometric view of a conveyor having an elongated article-diverting device as in FIG. 1 diverting articles to both sides.

FIG. 5 shows an elongated article-diverting device 50 receiving the article 36 from the infeed conveyor 12 and selectively diverting the article to one of four transverse receiving conveyors 16A, 16B, 16C, and 16D. The elongated article-receiving device 50 has four independently actuated divert zones 52A-52D along its length, each corresponding to one of the receiving conveyors 16A-16D. The elongated article-diverting device 50 can be realized as four individual article-diverting devices 12 as in FIG. 1 arranged in line. An in-line receiving conveyor (not shown) can be positioned at the downstream end of the elongated article-diverting device 54 to receive articles not diverted. When the spirals in a divert zone are rotated in the same direction, articles pass through the zone without being diverted, as in FIG. 2. When the left-handed spirals in a divert zone are rotated in a direction opposite to the direction of rotation of the right-handed spirals, articles are diverted, as in FIG. 3. And, when diverting articles, the left-handed spirals and the right-handed spirals in the divert zones 52A, 52C for the receiving conveyors 16A, 16C on one side of the device 50 are rotated opposite to the direction of the left-handed spirals and the right-handed spirals in the divert zones 52B, 52D for the receiving conveyors 16B, 16D on the opposite side.

Figure 6:
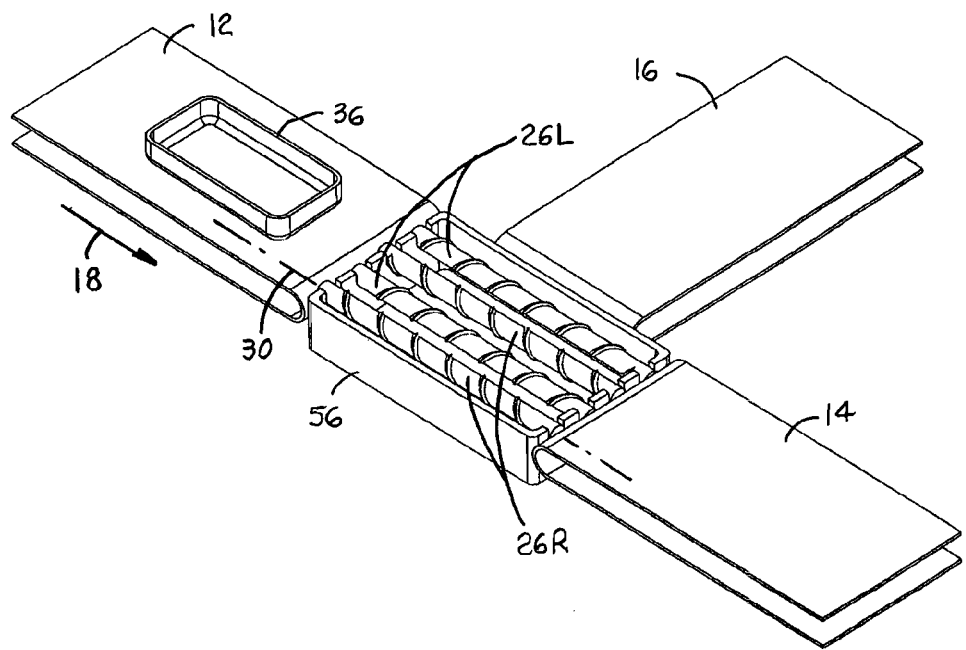
FIG. 6 is an isometric view of a conveyor having an article-diverting device rotated 90° with respect to the infeed and receiving conveyors of FIG. 1.

In FIG. 6, the article-diverting device 56 is rotated 90° relative to the infeed conveyor 12, the in-line receiving conveyor 14, and the transverse receiving conveyor 16 from the article-diverting device 22 of FIG. 1 so that the axes of rotation 30 of the spirals 26L, 26R are parallel to the in-line conveying direction 18. In the device in FIG. 6, the alternating left- and right-handed spirals 26L, 26R are rotated in the same direction to divert the articles 36 to the transverse receiving conveyor 16 and in opposite directions to pass the article across without diversion onto the in-line receiving conveyor 14.

Figure 7:
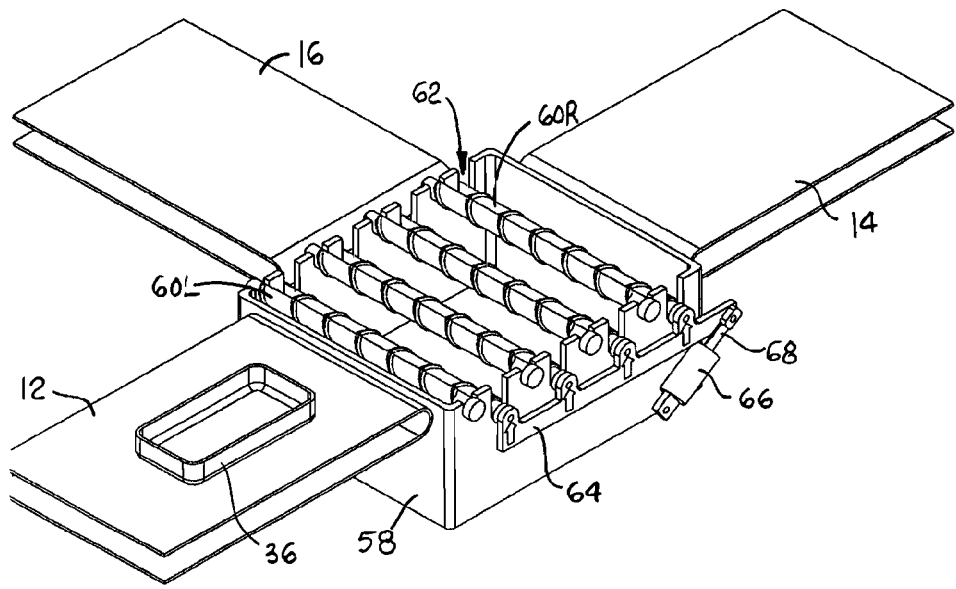
FIG. 7 is an isometric view of a conveyor as in FIG. 1, but with an article-diverting device having pop-up spirals.

In the article-diverting device 58 of FIG. 7, the left-handed spirals 60L are the same as those in the article-diverting device of FIG. 1, except that they can be constantly rotating. The right-handed spirals 60R are mounted in vertical slots 62 in the opposite sides of the article-diverting device 58. The slots 62 extend downward below the level of the left-handed spirals 60L. An arm 64 is pivotally attached to the ends of the right-handed spirals 60R and to a linear actuator, such as a pneumatic cylinder 66, attached at its opposite end to a conveyor frame. A piston arm 68 of the cylinder is selectively extended to raise the right-handed spirals 60R up to the level of the left-handed spirals 60L or retracted to lower the right-handed spirals 60R down to a level below the left-handed spirals 60L. When the right-handed spirals 60R are lowered and out of contact with the articles 36, the rotating left-handed spirals 60L pass the articles across from the infeed conveyor 12 to the in-line outfeed conveyor 14. When the right-handed spirals 60R are raised to the same level as the left-handed spirals 60L and rotated in the opposite direction to the left-handed spirals, the article-diverting device 58 diverts the articles 36 to the transverse receiving conveyor 16.

Figure 8:
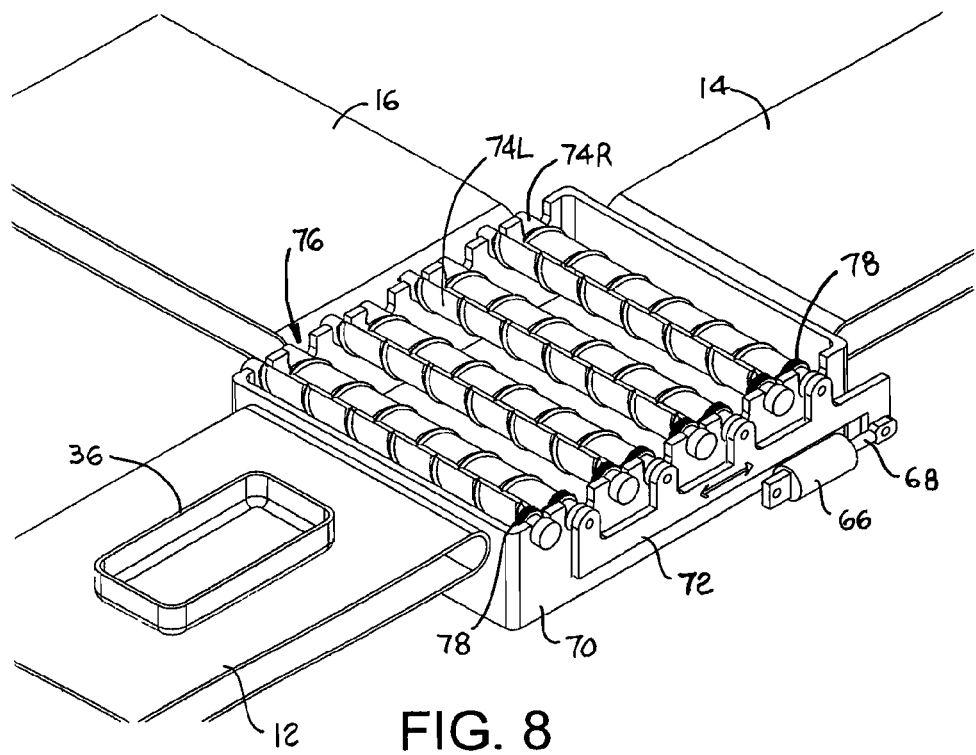
FIG. 8 is an isometric view of a conveyor as in FIG. 1, but with an article-diverting device having geared, shiftable spirals.

The article-diverting device 70 of FIG. 8 has a linear actuator 66 similar to the one in FIG. 7. The piston arm 68 is pinned to a rack arm 72 pivotally connected to the ends of right-handed spirals 74R. The ends of the right-handed spirals 74R rest in horizontally elongated slots 76 on opposite sides of the article-diverting device 70. Left-handed spirals 74L are mounted in fixed positions and always actuated to rotate. The right- and left-handed spirals 74R, 74L have gears 78 at one end. When the piston arm 68 of the cylinder 66 is extended, the right-handed spirals 74R are moved away from the left-handed spirals 74L and allowed to freely rotate. The articles 36, driven by the left-handed spirals 74L, pass right over the article-diverting device 78 from the infeed conveyor 12 to the in-line receiving conveyor 14. When the piston arm 68 is retracted, the right-handed spirals 74R are moved toward the left-handed spirals 74L so that their gears 78 mesh. The rotation of the left-handed spirals 74L is transmitted through the gears to the right-handed spirals 74R which are rotated in the opposite direction. The oppositely rotating pairs of opposite spirals divert the articles 36 to the transverse receiving conveyor 16.

Figure 4:
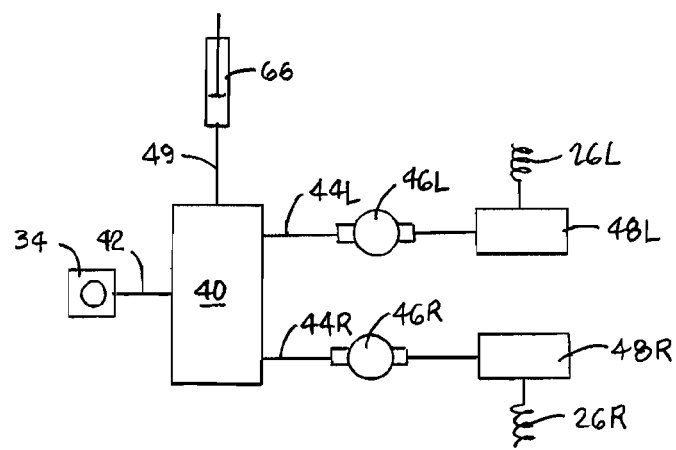
FIG. 4 is a schematic block diagram of a motorized spiral drive and auxiliary components used to drive the article-diverting device of FIG. 1.

One version of a motorized spiral drive 32 is shown schematically in FIG. 4. The drive includes a controller 40, such as a programmable logic controller or other computer, receiving a signal 42 from the sensor 34 indicating the presence of an article on the diverting device 22. The controller then decides whether the article is to be transported straight through in the first direction or diverted in the second direction. The controller sends motor control signals 44L, 44R to each of the two motors 46L, 46R. The motor control signals include information that controls the direction of motor rotation and may also control motor speed. The motors' shafts are coupled to the spirals 26L, 26R by drive trains 48L, 48R. Alternatively, a single motor, coupled through separate drive trains with reversers controlled by the controller, can be used. Or each spiral, instead of each set of spirals, could be controlled independently. And, of course, a diverter with more than four spirals could be used. When used with the diverting devices 58, 70 of FIGS. 7 and 8, the controller sends an actuator signal 49 to the actuator 66 to actuate the right-handed spirals 60R, 74R to selectively divert the articles. So, as these few examples indicate, the scope of the claims is not meant to be limited to the details of the exemplary versions.

What is claimed is:

1. An article-diverting conveying device comprising:
   a frame;
   a first set of one or more left-handed spirals rotatably supported in the frame on axes of rotation;
   a second set of one or more right-handed spirals alternately arranged parallel to the first set of left-handed spirals and rotatably supported in the frame on axes of rotation;
   a motorized spiral drive rotating the first and second sets on their axes of rotation, wherein the motorized spiral drive rotates the first set and the second set in the same direction to transport conveyed articles across the spirals in a first direction and wherein the motorized spiral drive rotates the first set and the second set in opposite directions to divert conveyed articles across the spirals in a different second direction;
   an actuator selectively actuating one of the first set of left-handed spirals and the second set of right-handed spirals.

2. The device of claim 1 wherein the motorized spiral drive rotates both sets at the same speed.

3. The device of claim 1 wherein the motorized spiral drive rotates the first set at a first speed and the second set at a different second speed.

4. The device of claim 1 wherein the first and second directions are perpendicular to each other.

5. The device of claim 1 wherein the first direction is perpendicular to the axes of rotation of the first and second sets of spirals and the second direction is parallel to the axes of rotation of the first and second sets of spirals.

6. The device of claim 1 wherein the first direction is parallel to the axes of rotation of the first and second sets of spirals and the second direction is perpendicular to the axes of rotation of the first and second sets of spirals.

7. The device of claim 1 wherein the spirals have rounded edges that contact conveyed articles.

8. The device of claim 1 wherein the spirals are made of a high-friction material.

9. The device of claim 1 wherein the actuator selectively actuates the one of the first set of left-handed spirals and the second set of right-handed spirals by raising and lowering the one of the first set of left-handed spirals and the second set of right-handed spirals until all the left-handed spirals and the right-handed spirals are at the same level.

10. The device of claim 1 wherein the left-handed spirals and the right-handed spirals include gears and wherein the actuator selectively actuates the one of the first set of left-handed spirals and the second set of right-handed spirals by moving the first and second sets together so that their gears mesh.

11. The device of claim 1 wherein the other of the first set of left-handed spirals and the second set of right-handed spirals is constantly rotated.

12. A conveyor comprising:
an infeed conveyor;
a diverting device receiving articles from the infeed conveyor and including:
a frame;
a first set of one or more left-handed spirals rotatably supported in the frame on axes of rotation;
a second set of one or more right-handed spirals alternately arranged parallel to the first set of left-handed spirals and rotatably supported in the frame on axes of rotation;
a motorized spiral drive rotating the first and second sets on their axes of rotation, wherein the motorized spiral drive rotates the first set and the second set in the same direction to transport articles across the spirals in a first direction and wherein the motorized spiral drive rotates the first set and the second set in opposite directions to divert articles across the spirals in a different second direction;
an actuator selectively actuating one of the first set of one or more left-handed spirals and the second set of one or more right-handed spirals.

13. The conveyor of claim 12 wherein the infeed conveyor delivers articles to the diverting device in the first direction.

14. The conveyor of claim 13 further comprising a first receiving conveyor receiving articles transported across the diverting device in the first direction and a second receiving conveyor receiving articles transported across the diverting device in the second direction.

15. The conveyor of claim 14 wherein the motorized spiral drive rotates the first set and the second set in opposite directions to divert articles across the spirals in a third direction opposite the second direction and wherein the conveyor further comprises a third receiving conveyor receiving articles transported across the diverting device in the third direction.

16. The conveyor of claim 13 wherein the diverting device has a first side and an opposite second side defining the width of the diverting device and wherein the conveyor further comprises at least one receiving conveyor on each of the first side and the second side of the diverting device.

17. The conveyor of claim 12 wherein the actuator selectively actuates the one of the first set of one or more left-handed spirals and the second set of one or more right-handed spirals by raising and lowering the one of the first set of one or more left-handed spirals and the second set of one or more right-handed spirals until all the left-handed and right-handed spirals are at the same level.

18. The device of claim 12 wherein the one or more left-handed spirals and the one or more right-handed spirals include gears and wherein the actuator selectively actuates the one of the first set of one or more left-handed spirals and the second set of one or more right-handed spirals by moving the first and second sets together so that their gears mesh.

19. The device of claim 12 wherein the motorized spiral drive constantly rotates the other of the first set of one or more left-handed spirals and the second set of one or more right-handed spirals.

* * * * *